US012053820B2

(12) United States Patent
Taira et al.

(10) Patent No.: US 12,053,820 B2
(45) Date of Patent: Aug. 6, 2024

(54) DUST CORE COMPOUND, MOLDED BODY, AND DUST CORE

(71) Applicant: Showa Denko Materials Co., Ltd., Tokyo (JP)

(72) Inventors: Arisa Taira, Tokyo (JP); Chio Ishihara, Tokyo (JP); Teruo Itoh, Tokyo (JP); Kosuke Urashima, Tokyo (JP); Kazumasa Takeuchi, Tokyo (JP)

(73) Assignee: RESONAC CORPORATION, Tokyo (JP)

(*) Notice: Subject to any disclaimer, the term of this patent is extended or adjusted under 35 U.S.C. 154(b) by 0 days.

(21) Appl. No.: 17/925,731

(22) PCT Filed: Jul. 8, 2021

(86) PCT No.: PCT/JP2021/025846

§ 371 (c)(1),
(2) Date: Nov. 16, 2022

(87) PCT Pub. No.: WO2022/158003

PCT Pub. Date: Jul. 28, 2022

(65) Prior Publication Data

US 2023/0191480 A1 Jun. 22, 2023

(30) Foreign Application Priority Data

Jan. 21, 2021 (JP) ................................ 2021-007929

(51) Int. Cl.

| | |
|---|---|
| ***B22F 1/102*** | (2022.01) |
| ***B22F 1/16*** | (2022.01) |
| ***B22F 3/00*** | (2021.01) |
| ***H01F 1/26*** | (2006.01) |
| ***H01F 1/33*** | (2006.01) |
| ***H01F 27/255*** | (2006.01) |

(52) U.S. Cl.
CPC ................ *B22F 1/102* (2022.01); *B22F 1/16* (2022.01); *B22F 3/00* (2013.01); *H01F 1/26* (2013.01); *H01F 1/33* (2013.01); *H01F 27/255* (2013.01); *B22F 2999/00* (2013.01)

(58) Field of Classification Search
None
See application file for complete search history.

(56) References Cited

U.S. PATENT DOCUMENTS 4,063,000 A * 12/1977 Aonuma ................ H01F 1/061 427/127
2012/0219451 A1* 8/2012 Hanejko .................. B22F 3/02 428/407
2013/0181802 A1* 7/2013 Watanabe ................. H01F 1/24 252/62.51 R

FOREIGN PATENT DOCUMENTS

| | | | |
|---|---|---|---|
| EP | 3719050 A1 | | 10/2020 |
| JP | 2005317937 A | * | 11/2005 |
| JP | 2013-138159 A | | 7/2013 |
| JP | 2015070028 A | * | 4/2015 |

OTHER PUBLICATIONS

Machine translation JP-2005317937-A (Year: 2023).*
Machine translation JP-2015070028-A (Year: 2023).*

* cited by examiner

*Primary Examiner* — Alexandre F Ferre
(74) *Attorney, Agent, or Firm* — FITCH, EVEN, TABIN & FLANNERY, LLP

(57) ABSTRACT

A compound for dust core includes a metal powder including iron, a resin composition, and a metal salt, in which the metal salt is represented by $R_2M$, R represents a saturated fatty acid group having 6 or more and 12 or less carbon atoms, and M represents at least one metal element between Ca and Ba.

25 Claims, No Drawings

DUST CORE COMPOUND, MOLDED BODY, AND DUST CORE

CROSS-REFERENCE TO RELATED APPLICATIONS

This application is a U.S. national phase application filed under 35 U.S.C. § 371 of International Application No PCT/JP2021/025846, filed Jul. 8, 2021, designating the United States, which claims priority from Japanese application No. 2021-007929, filed Jan. 21, 2021, which is incorporated herein by reference in its entirety.

TECHNICAL FIELD

The present disclosure relates to a compound used for dust core, a green compact (molded body), and a dust core.

BACKGROUND ART

A dust core is obtained by compacting of a compound including a soft magnetic powder and a resin composition (see the following Patent Literature 1). The degree of freedom of the shape of the dust core is high, and the scope of design of the shape of the dust core is broad. Furthermore, the product yield rate of the dust core in the production process is high, and the material cost of the dust core can be reduced. From these advantages, dust cores are applied to a variety of soft magnetic components. For example, dust cores are used for inductors, transformers, reactors, thyristor valves, noise filters (EMI filters), choke coils, motor cores, rotors and yokes of general electrical appliances and motors for industrial equipment, solenoid cores (fixed cores) for electromagnetic valves incorporated into electronically controlled fuel injection apparatuses for diesel engines and gasoline engines, and the like.

CITATION LIST

Patent Literature

Patent Literature 1: Japanese Unexamined Patent Publication No. 2013-138159

SUMMARY OF INVENTION

Technical Problem

Dust cores used in sensors and the like are usually produced by a die lubrication method. In the die lubrication method, a lubricating agent is not mixed with raw materials (compound), and a dust core is obtained by compacting of a compound using a die that has been coated in advance with a lubricating agent. Therefore, in the case of the die lubrication method, a lubricating agent is less likely to be contained in the inner part of a dust core, and the mechanical strength of the dust core is secured. However, the die lubrication method may not be applied depending on the shape of the dust core. When the die lubrication method cannot be applied, an internal lubrication method is used. In the internal lubrication method, a dust core is produced by compacting and heat treatment of a compound to which a lubricating agent has been added in advance. However, when a common lubricating agent such as zinc stearate is added to the compound, the crushing strength of a dust core obtainable by the internal lubrication method is significantly lowered as compared with a dust core obtainable by a die lubrication method.

An object according to an aspect of the present invention is to provide a compound used for dust core that increases the mechanical strength (for example, radial crushing strength) of a dust core, a green compact including the compound for dust core, and a dust core formed from the compound for dust core.

Solution to Problem

A compound for dust core according to an aspect of the present invention includes a metal powder including iron, a resin composition, and a metal salt, and the metal salt is represented by $R_2M$, in which R represents a saturated fatty acid group having 6 or more and 12 or less carbon atoms, and M represents at least one metal element between Ca and Ba.

The resin composition may include at least one resin selected from the group consisting of an epoxy resin, a bismaleimide resin, a polyimide resin, and a polyphenylene sulfide resin.

R may be a saturated fatty acid group having 6 or more and 10 or less carbon atoms.

The compound for dust core may include a first powder including a metal powder and a resin composition; and a second powder including a metal salt.

A green compact according to another aspect of the present invention includes the above-described compound for dust core.

R may be a saturated fatty acid group having 6 or more and 10 or less carbon atoms, at least a portion of the surface of a portion or all of metal particles constituting the metal powder may be covered with a resin composition, and the metal salt may be dispersed in the green compact.

The green compact may have an annular shape or a tubular shape.

A dust core according to another aspect of the present invention is formed from the above-described compound for dust core.

R may be a saturated fatty acid group having 6 or more and 10 or less carbon atoms, at least a portion of the surface of a portion or all of metal particles constituting the metal powder may be covered with a resin composition, and the metal salt may be dispersed in the dust core.

The dust core may have an annular shape or a tubular shape.

Advantageous Effects of Invention

According to an aspect of the present invention, there are provided a compound for dust core that increases the mechanical strength (for example, radial crushing strength) of a dust core, a green compact including the compound for dust core, and a dust core formed from the compound for dust core.

DESCRIPTION OF EMBODIMENTS

Hereinafter, suitable embodiments of the present invention will be described. The present invention is not intended to be limited to the following embodiments.

[Overview of Compound for Dust Core, Green Compact, and Dust Core]

The compound for dust core according to the present embodiment includes a metal powder (soft magnetic powder) including iron, a resin composition, and a metal salt. The term compound as described below means the "compound for dust core".

The resin composition is not particularly limited. The resin composition may be a composition functioning as a binder that binds individual metal particles constituting a metal powder to one another. For example, the resin composition may include at least one resin between a thermosetting resin and a thermoplastic resin. The thermosetting resin may be, for example, at least one resin selected from the group consisting of an epoxy resin, a phenol resin (including a phenol novolac resin), a bismaleimide resin, and a polyamideimide resin. When the resin composition includes both an epoxy resin and a phenol resin, the phenol resin may function as a curing agent for the epoxy resin. The thermoplastic resin may be, for example, at least one resin selected from the group consisting of a polyamide resin, a polyimide resin, a polyphenylene sulfide resin, an acrylic resin, polyethylene, polypropylene, polystyrene, polyvinyl chloride, and polyethylene terephthalate. The resin composition may include both a thermosetting resin and a thermoplastic resin. The resin composition may also include a silicone resin.

For example, the resin composition may include at least one resin selected from the group consisting of an epoxy resin, a bismaleimide resin, a polyimide resin, and a polyphenylene sulfide resin. The resin composition may include a plurality of resins selected from the group consisting of an epoxy resin, a bismaleimide resin, a polyimide resin, and a polyphenylene sulfide resin. The resin composition may also include another component (for example, another resin), in addition to the at least one resin selected from the group consisting of an epoxy resin, a bismaleimide resin, a polyimide resin, and a polyphenylene sulfide.

The metal salt is represented by $R_2M$. R is a saturated fatty acid group having 6 or more and 12 or less carbon atoms. M represents at least one divalent metal element between Ca (calcium) and Ba (barium).

As the compound includes a metal salt represented by $R_2M$ together with a resin composition, the dust core formed from the compound can have high mechanical strength (for example, crushing strength or radial crushing strength). That is, when the saturated fatty acid group R has 6 or more and 12 or less carbon atoms, and M is at least one metal element between Ca and Ba, the dust core can have high mechanical strength. Therefore, even when the dust core or a green compact, which is a precursor of the dust core, has a complicated or thin-walled shape, a dust core having high mechanical strength can be produced by an internal lubrication method. For example, even when the dust core has an annular shape or a tubular shape, the dust core can have high radial crushing strength.

When R has fewer than 6 carbon atoms, the compound is less likely to have sufficient flowability and mold releasability, it is difficult to compact the compound, the dust core is less likely to have a desired shape and a desired dimension, and the dust core is less likely to have high mechanical strength. Even when R has more than 12 carbon atoms, the dust core is less likely to have high mechanical strength. The mechanism by which a decrease in the mechanical strength of the dust core is suppressed in the present embodiment is not necessarily clearly understood. The inventors consider that a decrease in the mechanical strength of the dust core is suppressed by the following mechanism.

When the compound includes a zinc salt of a long-chain saturated fatty acid, such as zinc stearate, as a lubricating agent instead of the metal salt $R_2M$, the lubricating agent is easily dispersed in the resin composition (binder resin) included in a dust core formed from the compound. In contrast, when the dust core is formed from a compound including the above-described metal salt $R_2M$ as a main lubricating agent, a large amount of the metal salt $R_2M$ is likely to exist in the vicinity of the surface of the dust core, and the amount of the metal salt $R_2M$ existing in the inner part of the dust core (portion remote from the surface of the dust core) is small. As a result, a decrease in the mechanical strength of the resin composition included in the inner part of the dust core is suppressed, and a decrease in the mechanical strength of the dust core is also suppressed. The reason why the state of existence of the metal salt $R_2M$ in the dust core is different from the state of existence of a long-chain saturated fatty acid salt (zinc stearate or the like) in the dust core, is that the compatibility of the metal salt $R_2M$ constructed of at least any one of Ca and Ba with the resin composition is different from the compatibility of the long-chain saturated fatty acid salt constructed of Zn with the resin composition. Since a Ba salt and a Ca salt easily forms the water of hydration, there is also a possibility that the Ba salt and the Ca salt may contribute to the above-described compatibility or the mechanical strength of the dust core. The reason why the lubrication performance of the metal salt $R_2M$ constructed of a short alkyl chain (R) as compared with a long-chain saturated fatty acid group (stearic acid group or the like) can be maintained, is considered to be attributable to the above-described mechanism. However, the technical scope of the present invention is not intended to be limited by the mechanism.

The compound may be a mixture including a metal powder including iron, a resin composition, and the metal salt $R_2M$. The resin composition may further include a curing agent, a coupling agent, and additives, in addition to the above-described resin. The additives may be, for example, a curing accelerator and a flame retardant. The resin composition may also include the metal salt $R_2M$ as an additive. The resin composition may include a wax different from the metal salt $R_2M$. In the following description, for illustrative purposes, a component including a resin, a curing agent, a coupling agent, and additives is described as "resin composition". That is, the resin composition may be a component that can include a resin, a curing agent, a coupling, and additives, the component being a residual component (non-volatile component) remaining after excluding an organic solvent and the metal powder from the compound.

As described above, the resin composition functions as a binder that binds the individual metal particles constituting the metal powder to one another and imparts mechanical strength to a green compact formed from the compound. For example, when the compound is formed at a high pressure by using a die, the resin composition fills the spaces between the metal particles and binds the metal particles to one another. When the resin composition includes a thermosetting resin, by curing the resin composition in the green compact by a heat treatment, a cured product of the resin composition binds the metal particles more firmly, and thus a dust core having high mechanical strength is obtained.

The compound may be a powder. For example, the compound may include a first powder including a metal powder and a resin composition; and a second powder including a metal salt. The first powder may include a metal powder and a powdered resin composition. The surface of each of the metal particles constituting the metal powder included in the first powder may be covered with an insulating film. For example, the insulating film may be an oxide of a metal constituting the metal powder (iron oxide or the like). The insulating film may also be glass. The first powder may include a metal powder and a resin composition covering each of the metal particles constituting the metal powder. That is, the individual particles constituting the first powder may have a metal particle and a resin composition covering the surface of the metal particle. The resin composition covering the surface of the metal particles may function as an insulating film. The individual particles constituting the first powder may have a metal particle; an insulating film covering the surface of the metal particle; and a resin composition covering the surface of the insulating film. It is also acceptable that the individual particles constituting the first powder are composed only of a metal particle and a resin composition. The individual particles constituting the second powder may include the metal salt $R_2M$. The individual particles constituting the second powder may be composed only of the metal salt $R_2M$. For example, when the metal salt $R_2M$ functions as a wax, the individual particles constituting the second powder may be composed only of the metal salt $R_2M$. The individual particles constituting the second powder may include both the metal salt $R_2M$ and a wax different from the metal salt. The individual particles constituting the second powder may be composed only of the metal salt $R_2M$ and the wax. The compound may be a mixture of the first powder and the second powder. The first powder and the second powder in the compound may be uniformly mixed. The compound may be composed only of the first powder and the second powder. The compound may be composed only of one kind of powder in which a metal powder, a resin composition, and the metal salt $R_2M$ are integrated. The compound may be composed only of one kind of powder in which a metal powder, a resin composition, the metal salt $R_2M$, and a wax different from $R_2M$ are integrated.

As the compound has a second powder composed only of the metal salt $R_2M$, or a second powder including the metal salt $R_2M$ and another wax, the entire compound can have excellent flowability derived from the metal salt or wax. Excellent flowability may be rephrased as a property that the compound can easily flow. A conventional compound powder that does not include the second powder has inferior flowability as compared with a compound including the first powder and the second powder. For example, a compound powder composed only of one kind of powder in which metal particles, a resin composition, and the metal salt $R_2M$ are integrated tends to have inferior flowability as compared with a compound including the first powder and the second powder.

A green compact according to the present embodiment includes the above-described compound for dust core. The green compact is obtained by compacting of the compound packed inside a die. In the present embodiment, compacting of the compound can be performed at normal temperature. Compacting of the compound can also be performed while heating a compound powder.

The dust core according to the present embodiment is formed from the above-described compound for dust core. The dust core may include a cured product of the compound for dust core. For example, as a result of a heat treatment of the green compact taken out from a die, the resin composition in the green compact is cured, and the metal particles in the green compact are bound to one another by a cured product of the resin composition. As a result, a dust core is obtained.

(Details of Metal Salt $R_2M$)

As mentioned above, R constituting the metal salt $R_2M$ is a saturated fatty acid group having 6 or more and 12 or less (6 or more and 10 or less, or 12) carbon atoms. M constituting the metal salt $R_2M$ is at least one metal element between Ca and Ba. The saturated fatty acid group R having 6 or more and 12 or less carbon atoms may be at least one saturated fatty acid group selected from the group consisting of a caproic acid group ($CH_3(CH_2)_4COO—$) having 6 carbon atoms, an enanthic acid group ($CH_3(CH_2)_5COO—$) having 7 carbon atoms, a caprylic acid group ($CH_3(CH_2)_6COO—$) having 8 carbon atoms, a pelargonic acid group ($CH_3(CH_2)_7COO—$) having 9 carbon atoms, a capric acid group ($CH_3(CH_2)_8COO—$) having 10 carbon atoms, and a lauric acid group ($CH_3(CH_2)_{10}COO—$) having 12 carbon atoms. That is, the metal salt represented by $R_2M$ may include at least one metal salt selected from the group consisting of calcium caproate ($(CH_3(CH_2)_4COO)_2Ca$), barium caproate ($(CH_3(CH_2)_4COO)_2Ba$), calcium enanthate ($(CH_3(CH_2)_5COO)_2Ca$), barium enanthate ($(CH_3(CH_2)_5COO)_2Ba$), calcium caprylate ($(CH_3(CH_2)_6COO)_2Ca$), barium caprylate ($(CH_3(CH_2)_6COO)_2Ba$), calcium pelargonate ($(CH_3(CH_2)_7COO)_2Ca$), barium pelargonate ($(CH_3(CH_2)_7COO)_2Ba$), calcium caprate ($(CH_3(CH_2)_8COO)_2Ca$), barium caprate ($(CH_3(CH_2)_8COO)_2Ba$), calcium laurate ($(CH_3(CH_2)_{10}COO)_2Ca$), and barium laurate ($(CH_3(CH_2)_{10}COO)_2Ba$). The compound may include a plurality of metal salts among the above-described metal salts. The compound may include a partially saponified saturated fatty acid ester containing the above-described metal salts.

R may be a saturated fatty acid group having 6 or more and 10 or less carbon atoms. That is, the metal salt represented by $R_2M$ may include at least one metal salt selected from the group consisting of calcium caproate, barium caproate, calcium enanthate, barium enanthate, calcium caprylate, barium caprylate, calcium pelargonate, barium pelargonate, calcium caprate, and barium caprate. When R is a saturated fatty acid group having 6 or more and 10 or less carbon atoms, rust of the metal powder in a green compact (green compact before heat treatment) formed from the compound is easily suppressed, and rust of the metal powder in a dust core (green compact after heat treatment) formed from the compound is also easily suppressed. For example, rust of the metal powder in the green compact and in the dust core in the presence of water is easily suppressed.

The inventors speculate that rust of the metal powder in the green compact and in the dust core in the presence of water is suppressed by the following mechanism.

With regard to the green compact formed from the compound, at least a portion of the surface of a portion or all of the metal particles constituting the metal powder is covered with the resin composition, and the metal salt is dispersed in the green compact. The metal salt may exist in the resin composition included in the green compact. Furthermore, also with regard to the dust core (green compact after heat treatment) formed from the compound, at least a portion of the surface of a portion or all of the metal particles constituting the metal powder is covered with the resin composition (uncured resin composition or a cured product of the resin composition), and the metal salt is dispersed in the dust core. The metal salt may exist in the resin composition included in the dust core. When the surface of the metal particles is exposed without being covered with the resin composition, there is a possibility that the exposed surface of the metal particles may come into direct contact with water. As a result, the exposed surface of the metal particles is likely to be oxidized by water, and rust is likely to be generated. However, when R is a saturated fatty acid group having 6 or more and 10 or less carbon atoms, saturated fatty acid ions ($R^-$) are likely to be produced as a result of dissociation of the metal salt ($R_2M$) in water, and oxygen ($O^-$) in the carboxylate group (—$COO^-$) constituting the saturated fatty acid ion is likely to be bonded to a metal element (for example, iron) located on the exposed surface of a metal particle. As a result, the surface of metal particles that are not covered with the resin composition is covered with saturated fatty acid groups, and the saturated fatty acid groups suppress oxidation of the surface of the metal particles. That is, the saturated fatty acid groups derived from the metal salt suppress direct contact between the surface of the metal particles and water and suppress rust of the metal powder in the green compact and in the dust core. When R has more than 10 carbon atoms, since the metal salt ($R_2M$) is less likely to be dissociated in water, and saturated fatty acid ions ($R^-$) are less likely to be produced, it is difficult to suppress rust of the metal powder in the green compact and in the dust core. That is, a metal powder in a green compact including a metal salt with an R having more than 10 carbon atoms, is likely to rust in a short period of time in the presence of water, as compared with a metal powder in a green compact including a metal salt with an R having 6 or more and 10 or less carbon atoms. As is the case of the green compact, the metal powder in a dust core including a metal salt with R having more than 10 carbon atoms is likely to rust in a short period of time in the presence of water, as compared with the metal powder in a dust core including a metal salt with R having 6 or more and 10 or less carbon atoms.

From the viewpoint that rust of the metal powder in the green compact and in the dust core is more likely to be suppressed, R may be a saturated fatty acid group having 6 or more and 8 or less carbon atoms.

The metal salt represented by $R_2M$ may function as a wax. The term wax means either or both of a lubricating agent and a mold releasing agent. When the metal salt represented by $R_2M$ functions as a wax, since the compound can have excellent flowability derived from the metal salt, the compound is easily shaped into a desired shape. Furthermore, when the metal salt functions as a wax, a green compact formed from the compound is easily separated from the die without damaging the green compact.

The compound for dust core may include a metal salt represented by RMR', each of R and R' may be a saturated fatty acid group having 6 or more and 12 or less carbon atoms, the numbers of carbon atoms of each of R and R' may be different from each other, and M may be at least one metal element between Ca and Ba. The compound for dust core may include at least one metal salt between a magnesium salt of a saturated fatty acid and a strontium salt of a saturated fatty acid. For example, the compound for dust core may include at least one metal salt selected from the group consisting of $R_2Mg$, RMgR', $R_2Sr$, and RSrR', and each of R and R' may be a saturated fatty acid group having 6 or more and 12 or less carbon atoms.

The sum of the mass of the metal salt $R_2M$ may be 0.01 parts by mass or more and 0.70 parts by mass or less, and preferably 0.05 parts by mass or more and 0.50 parts by mass or less, with respect to 100 parts by mass of the metal powder. For example, the mass of the second powder formed from the metal salt $R_2M$ may be in the above-described range with respect to 100 parts by mass of the metal powder. When the sum of the mass of the metal salt $R_2M$ is in the above-described range, both excellent mold releasability and high mechanical strength of the dust core are easily achieved. When the mass of the metal salt $R_2M$ is too small, it is difficult to pull out the dust core obtained by compacting of the compound from the die. When the mass of the metal salt $R_2M$ is too large, the mechanical strength of the dust core tends to decrease. However, even when the sum of the mass of the metal salt $R_2M$ is out of the above-described range, the effect of the present invention can be obtained.

(Details of Resin)

As described above, the resin composition constituting the compound may include at least one resin selected from the group consisting of an epoxy resin, a bismaleimide resin, a polyimide resin, and a polyphenylene sulfide resin.

<Epoxy Resin>

The epoxy resin may be a thermosetting resin. It is preferable that the epoxy resin is a powder. The epoxy resin may be, for example, at least one resin selected from the group consisting of a biphenyl type epoxy resin, a stilbene type epoxy resin, a diphenylmethane type epoxy resin, a sulfur atom-containing type epoxy resin, a novolac type epoxy resin, a dicyclopentadiene type epoxy resin, a salicylaldehyde type epoxy resin, a naphthol-phenol copolymerization type epoxy resin, an epoxide of an aralkyl type phenol resin, a bisphenol type epoxy resin, an alcohol glycidyl ether epoxy resin, a glycidyl ether type epoxy resin of a para-xylylene-modified phenol resin and/or a meta-xylylene-modified phenol resin, a glycidyl ether type epoxy resin of a terpene-modified phenol resin, a cyclopentadiene type epoxy resin, a glycidyl ether type epoxy resin of a polycyclic aromatic ring-modified phenol resin, a glycidyl ether type epoxy resin of a naphthalene ring-containing phenol resin, a glycidyl ester type epoxy resin, a glycidyl type or methylglycidyl type epoxy resin, an alicyclic type epoxy resin, a halogenated phenol novolac type epoxy resin, an ortho-cresol novolac type epoxy resin, a hydroquinone type epoxy resin, a thioether type epoxy resin, a trimethylolpropane type epoxy resin, and a linear aliphatic epoxy resin obtained by oxidizing an olefin bond with a peracid such as peracetic acid.

<Bismaleimide Resin>

The bismaleimide resin may be a thermosetting resin. It is preferable that the bismaleimide resin is a powder. The bismaleimide resin may include an addition reaction product of a polymaleimide (a) and an aminophenol (b); and an epoxy compound (c). An addition reaction product is obtained by a reaction between a polymaleimide (a) and an aminophenol (b), and a bismaleimide resin may be obtained by adding an epoxy compound (c) to the addition reaction product.

The polymaleimide (a) constituting the bismaleimide resin is represented by the following Chemical Formula A.

[Chemical Formula 1]

(A)

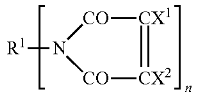

$R^1$ in Chemical Formula A is an n-valent organic group. Each of $X^1$ and $X^2$ is a monovalent atom selected from hydrogen or halogens, or a monovalent organic group. $X^1$ and $X^2$ may be identical, or $X^1$ and $X^2$ may be different from each other. n in Chemical Formula A is an integer of 2 or more.

The polymaleimide (a) may be, for example, at least one compound selected from the group consisting of ethylene bismaleimide, hexamethylene bismaleimide, m-phenylene bismaleimide, p-phenylene bismaleimide, 4,4'-diphenylmethane bismaleimide, 4,4'-diphenyl ether bismaleimide, 4,4'-diphenyl sulfone bismaleimide, 4,4'-dicyclohexylmethane bismaleimide, m-xylylene bismaleimide, p-xylylene bismaleimide, and 4,4'-phenylene bismaleimide. If necessary, the above-described polymaleimide (a) and a monomaleimide may be included in the bismaleimide resin. The monomaleimide may be, for example, N-3-chlorophenyl maleimide or N-4-nitrophenyl maleimide.

The aminophenol (b) constituting the bismaleimide resin is represented by the following Chemical Formula B.

[Chemical Formula 2]

(B)

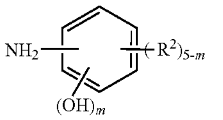

$R^2$ in Chemical Formula B represents a monovalent atom selected from hydrogen or halogens, or a monovalent organic group. m in Chemical Formula B is an integer of 1 to 5.

The aminophenol (b) may be at least one compound selected from the group consisting of o-aminophenol, m-aminophenol, p-aminophenol, o-aminocresol, m-aminocresol, p-aminocresol, aminoxylenol, aminochlorophenol, aminobromophenol, aminocatechol, aminoresorcin, aminobis(hydroxyphenol)propane, and aminooxybenzoic acid.

The epoxy compound (c) constituting the bismaleimide resin has two or more epoxy groups in a molecule. The epoxy compound (c) may be, for example, at least one compound selected from the group consisting of a bisphenol A type epoxy resin, a bisphenol F type epoxy resin, a novolac type epoxy resin, a glycidyl ester resin of a polycarboxylic acid, a polyglycidyl ether of a polyol, a urethane-modified epoxy resin, a fatty acid type polyepoxide obtained by epoxidizing an unsaturated compound, an alicyclic type polyepoxide obtained by epoxidizing an unsaturated compound, an epoxy resin having a heterocyclic ring, an epoxy resin having a heterocyclic ring, and an epoxy resin obtained by glycidating an amine.

An addition reaction product is obtained by a reaction between the above-mentioned polymaleimide (a) and the aminophenol (b). The proportion by mass of the aminophenol (b) may be 5 to 40 parts by mass, and preferably 10 to 30 parts by mass, with respect to 100 parts by mass of the polymaleimide (a). When the proportion by mass of the aminophenol (b) is less than 5 parts by mass, the compatibility between the addition reaction product and the epoxy compound (c) is insufficient. When the proportion by mass of the aminophenol (b) is more than 40 parts by mass, the bismaleimide resin includes an excess of amino groups, and heat resistance of the bismaleimide resin is lowered. The reaction temperature for the polymaleimide (a) and the aminophenol (b) may be, for example, 50° C. to 200° C., and preferably 80° C. to 180° C. The reaction time for the polymaleimide (a) and the aminophenol (b) may be appropriately adjusted within the range of several minutes to several dozen hours.

The content of the addition reaction product in the bismaleimide resin may be 30% to 80% by mass. When the content of the addition reaction product is less than 30% by mass, heat resistance of the bismaleimide resin is decreased. When the content of the addition reaction product is more than 80% by mass, mechanical strength of the bismaleimide resin is decreased. However, even when the content of the reaction product in the bismaleimide resin is out of the above-described range, the effect of the present invention can be obtained.

The bismaleimide resin may be, for example, at least one resin selected from KIR-30, MR-50, and KIR-100 (all trade names manufactured by KYOCERA Corporation).

<Polyimide Resin>

The polyimide resin may be a thermoplastic resin. It is preferable that the polyimide resin is a powder. The polyimide resin may be, for example, a dehydration polycondensation product of a tetracarboxylic acid anhydride and 4,4'-bis(3-aminophenoxy)biphenyl. The polyimide resin may be at least one resin selected from AURUM PL450C™, AURUM PL500A™, AURUM PL6200™, AURUM PD450L™ (hereinafter, commercial products manufactured by Mitsui Chemicals, Inc.), Solver PI-5600™ (commercial products manufactured by Solver Polyimide Company), and THERPLIM™ (commercial product manufactured by MITSUBISHI GAS CHEMICAL COMPANY, INC.).

<Polyphenylene Sulfide Resin>

The polyphenylene sulfide resin may be a thermoplastic resin. It is preferable that the polyphenylene sulfide resin is a powder. The polyphenylene sulfide resin may be, for example, represented by the following Chemical Formula 1. n in the following Chemical Formula 1 is any integer of 2 or greater. The polyphenylene sulfide resin may be at least one resin selected from TORELINA A900™ (commercial product manufactured by Toray Industries, Inc.), FORTRON KPS™ (commercial product manufactured by KUREHA CORPORATION), B-06PIM (Toray Industries, Inc.), ASPEX-PPS™ (commercial product manufactured by Aspect Co., Ltd.), DSP-B100™, PRIMEF 4010™, PRIMEF 7002™, and PRIMEF 7010™ (all being commercial products manufactured by DIC Corporation).

(1)

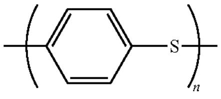

The sum of the masses of one or more resins included in the resin composition may be 0.01 parts by mass or more and 1.00 parts by mass or less, and preferably 0.03 parts by mass or more and 0.50 parts by mass or less, with respect to 100 parts by mass of the metal powder. For example, the sum of the mass of at least one resin selected from the group consisting of an epoxy resin, a bismaleimide resin, a polyimide resin, and a polyphenylene sulfide resin may be 0.01 parts by mass or more and 1.00 parts by mass or less, and preferably 0.03 parts by mass or more and 0.50 parts by mass or less, with respect to 100 parts by mass of the metal powder. When the sum of the masses of the resins in the compound is in the above-described range, the dust core is likely to achieve both excellent soft magnetic characteristics and high mechanical strength.

(Wax)

The compound may include a wax in addition to the metal salt $R_2M$. When the compound includes a wax, flowability and compaction properties of the compound are enhanced, and mold releasability of the compound is enhanced. As a result, the accuracy of the shape and dimension of the dust core is enhanced, and the structural defect of the dust core is easily suppressed. However, when the metal salt $R_2M$ sufficiently functions as a wax, it is preferable that the compound includes only the metal salt $R_2M$ among the metal salt $R_2M$ and other waxes. As the compound does not include a wax other than the metal salt $R_2M$, the mechanical strength of the dust core is easily enhanced. For a similar reason, when the compound includes both the metal salt $R_2M$ and another wax, it is preferable that the content (unit: % by mass) of the metal salt $R_2M$ in the compound is larger than the content of the other wax in the compound. The wax may be, for example, at least any one among a saturated fatty acid, a saturated fatty acid salt, and a saturated fatty acid ester. The wax may be, for example, at least one selected from the group consisting of lauric acid, myristic acid, pentadecylic acid, palmitic acid, margaric acid, stearic acid, arachidic acid, heneicosylic acid, behenic acid, lignoceric acid, cerotic acid, montanoic acid, melissic acid, calcium myristate, calcium pentadecylate, calcium palmitate, calcium margarate, calcium stearate, calcium arachidate, calcium heneicosylate, calcium behenate, calcium lignocerate, calcium cerotate, calcium montanoate, calcium melissate, barium myristate, barium pentadecylate, barium palmitate, barium margarate, barium stearate, barium arachidate, barium heneicosylate, barium behenate, barium lignocerate, barium cerotate, barium montanoate, barium melissate, a lauric acid ester, a myristic acid ester, a pentadecylic acid ester, a palmitic acid ester, a margaric acid ester, a stearic acid ester, an arachidic acid ester, a heneicosylic acid ester, a behenic acid ester, a lignoceric acid ester, a cerotic acid ester, a montanoic acid ester, and a melissic acid ester. The compound may also include a wax other than the above-described ones. For example, the wax may be at least one selected from the group consisting of magnesium salts of the above-described saturated fatty acids, aluminum salts of the above-described saturated fatty acids, 12-oxystearic acid, calcium ricinolate, stearic acid amide, oleic acid amide, erucic acid amide, behenic acid amide, palmitic acid amide, lauric acid amide, hydroxystearic acid amide, methylenebisstearic acid amide, ethylenebisstearic acid amide, ethylenebislauric acid amide, distearyladipic acid amide, ethylenebisoleic acid amide, dioleyladipic acid amide, N-stearylstearic acid amide, N-oleylstearic acid amide, N-stearylerucic acid amide, methylolstearic acid amide, methylolbehenic acid amide, ethylene glycol, stearyl alcohol, polyethylene glycol, polypropylene glycol, polytetramethylene glycol, silicone oil, silicon lubricant, a fluorine-based oil, a fluorine-based lubricant, a fluorine-containing resin powder, paraffin wax, polyethylene wax, amide wax, polypropylene wax, ester wax, carnauba wax, and microwax. The compound may include one kind of wax among the above-described ones. The compound may include a plurality of kinds of waxes among the above-described ones.

(Organic Solvent)

In the production process of the compound, a uniform compound can be obtained by coating the surface of individual metal particles constituting the metal powder with an organic solvent in which the resin composition is dissolved. The organic solvent is not limited as long as it is a solvent that can dissolve the resin composition. The organic solvent may be, for example, at least one solvent selected from the group consisting of acetone, methyl ethyl ketone, methyl isobutyl ketone, benzene, toluene, and xylene. In the case of considering workability, it is preferable that the organic solvent is a liquid at normal temperature, and it is preferable that the boiling point of the organic solvent is 60° C. or higher and 150° C. or lower. Such a solvent is preferably, for example, acetone or methyl ethyl ketone.

(Metal Powder)

The metal powder including iron (soft magnetic powder) may contain, for example, at least one selected from the group consisting of simple substance of iron and an alloy including iron. The metal powder may be composed only of at least one selected from the group consisting of simple substance of iron and an alloy including iron. As the metal powder includes at least any one of simple substance of Fe and an alloy including Fe, a green compact produced from the compound is likely to have a high space factor and excellent soft magnetic characteristics. The alloy including Fe may include at least one selected from the group consisting of a solid solution, a eutectic, and an intermetallic compound. The alloy may be, for example, stainless steel (an Fe—Cr-based alloy, an Fe—Ni—Cr-based alloy, or the like). The metal powder may be amorphous. The metal powder may include a plurality of metal elements. For example, the metal powder may include at least one element selected from the group consisting of a non-metal element, a noble metal element, a transition metal element, and a rare earth element, in addition to iron. The compound may include one kind of metal powder or may include a plurality of kinds of metal powders.

The metal element other than iron that is included in the metal powder may be at least one selected from the group consisting of, for example, copper (Cu), titanium (Ti), manganese (Mn), cobalt (Co), nickel (Ni), zinc (Zn), aluminum (Al), tin (Sn), chromium (Cr), barium (Ba), strontium (Sr), lead (Pb), and silver (Ag). The metal powder may also include an element other than a metal element. For example, the metal powder may include oxygen (O), beryllium (Be), phosphorus (P), boron (B), or silicon (Si). The metal powder may be, for example, at least one metal powder selected from the group consisting of an Fe—Si-based alloy, an Fe—Si—Al-based alloy (Sendust), an Fe—Ni-based alloy (Permalloy), an Fe—Cu—Ni-based alloy (Permalloy), an Fe—Co-based alloy (Permendur), an Fe—Cr—Si-based alloy (electromagnetic stainless steel), and invar.

The metal powder may be at least any one of an amorphous iron powder and a carbonyl iron powder. The metal powder may be an Fe amorphous alloy. As a commercial product of the Fe amorphous alloy powder, for example, at least one selected from the group consisting of AW2-08™, KUAMET-6B2™ (all trade names manufactured by EPSON ATMIX Corporation), DAP MS3™, DAP MS7™, DAP MSA10™, DAP PB™, DAP PC™, DAP MKV49™, DAP 410L™, DAP 430L™, DAP HYB™ series (all trade names manufactured by Daido Steel Co., Ltd.), MH45D™, MH28D™, MH25D™, and MH20D™ (all trade names manufactured by Kobe Steel, Ltd.).

The shape of the individual metal particles constituting the metal powder is not particularly limited. The individual metal particles may be flat. The individual metal particles may have, for example, a spherical shape or a needle-like shape. The particle size of the metal powder may be, for example, 60 μm or more and 150 μm or less. The particle size of the metal powder may be calculated on the basis of the mass measurement of the metal particles by means of sieving. The particle size of the metal powder may be measured by using a laser diffraction type particle size distribution analyzer. The compound may include a plurality of kinds of metal powders having different average particle sizes or median diameters (D50).

(Inorganic Filler)

The compound may include an inorganic filler. The inorganic filler may be composed of one kind of particles. The inorganic filler may be a combination of two or more kinds of particles. The average particle size of the inorganic filler may be 1 μm or more and 100 μm or less, preferably 1 μm or more and 50 μm or less, more preferably 1 μm or more and 20 μm or less, and particularly preferably 1.5 μm or more and 10 μm or less. It is preferable that the inorganic filler is a mixture of a plurality of kinds of fillers having different average particle sizes. As a result, the atomic packing factor and insulation properties of the dust core can be increased.

A preferable inorganic filler is silica ($SiO_2$) particles. The silica particles may be, for example, spherical silica obtainable by a sol-gel method, crushed silica micronized by pulverization, dry silica, or wet silica. It is preferable that the surface of the silica particles is treated with a coupling agent (for example, a silane coupling agent). As a result of attachment of a coupling agent to the surface of the silica particles, settling of the silica particles in the compound is suppressed, and a dust core in which silica particles are stably dispersed can be obtained.

(Use Applications of Dust Core)

The dust core may be used in, for example, inductors, transformers, reactors, thyristor valves, noise filters (EMI filters), choke coils, motor cores, rotors and yokes of general electrical appliances and motors for industrial equipment, solenoid cores (fixed cores) for electromagnetic valves incorporated into electronically controlled fuel injection apparatuses for diesel engines and gasoline engines, and the like. As described above, a green compact including the compound according to the present embodiment may have an annular shape or a tubular shape, and a dust core formed from the compound according to the present embodiment may have an annular shape or a tubular shape. According to the present embodiment, an annular-shaped or tubular-shaped dust core can have high radial crushing strength. An annular-shaped or tubular-shaped dust core may be used in, for example, a position sensor, a magnetostriction type sensor, or the like.

[Methods for Producing Compound for Dust Core, Green Compact, and Dust Core]

A solution of the resin composition is obtained by dissolving the raw materials of the resin composition in an organic solvent. The metal powder is added to the solution of the resin composition to disperse the metal powder in the solution of the resin composition, and then the organic solvent is removed from the solution including the metal powder and the resin composition by distillation under reduced pressure and drying. As a result, the surface of the individual metal particles constituting the metal powder is covered with the resin composition, and a first powder formed from the metal powder and the resin composition is obtained. When a compound including an inorganic filler is produced, the inorganic filler may be added to the solution of the resin composition together with the metal powder. As described above, a surface treatment of the inorganic filler by a silane coupling agent may be carried out in advance.

In the step of removing the organic solvent from the solution including the metal powder and the resin composition, it is preferable to perform distillation under reduced pressure of the organic solvent at normal temperature while stirring the solution by using an evaporator. The first powder may be obtained by further drying the solid obtained by distillation under reduced pressure in a reduced-pressure drier or the like and then appropriately pulverizing the solid. Instead of distillation under reduced pressure, it is also acceptable to perform distillation at normal pressure while stirring the solution with a kneader or the like. As a method for drying the solid obtained by distillation, heating is not preferred. However, the solid may be dried by heating of the solid at 80° C. or lower, and preferably 60° C. or lower.

The compound for dust core may be obtained by mixing the first powder obtained according to the above-described method and a second powder including the metal salt $R_2M$. The compound may also be obtained by mixing the metal powder, the resin composition, and the metal salt $R_2M$ all at once. A solvent is used for the above-mentioned method for producing the compound; however, the compound may also be produced without using a solvent. That is, the compound may be produced by dry mixing that does not use a solvent. For example, in the case of dry mixing, the compound may be obtained by mixing a metal powder composed of metal particles covered with an insulating film, a powdered resin composition, and a powdered metal salt $R_2M$ in a tightly sealed container at normal temperature and normal pressure.

The green compact is obtained by compacting of the compound packed in a die. As the forming pressure is higher, the soft magnetic characteristics (magnetic permeability and the like) and mechanical strength of the dust core are increased. The forming pressure may be, for example, 500 MPa or greater and 2500 MPa or less. When the mass productivity and the life of the die are also taken into consideration, the die pressure may be 700 MPa or greater and 2000 MPa or less. The density of the green compact may be preferably 75% or more and 90% or less, and more preferably 80% or more and 90% or less, with respect to the true density of the metal powder. When the density of the green compact is within the above-described range with respect to the true density of the metal powder, a dust core having excellent soft magnetic characteristics and mechanical strength can be produced.

The resin composition in the green compact may be cured by a heat treatment of the green compact. By binding the metal particles in the green compact to one another with a cured product of the resin composition, a dust core having high mechanical strength is likely to be obtained. The heat treatment temperature of the green compact may be any temperature at which the resin composition sufficiently cures. The heat treatment temperature of the green compact may be, for example, 150° C. or higher and 450° C. or lower, and preferably 200° C. or higher and 350° C. or lower. The atmosphere of the heat treatment may be an air atmosphere (preferably, a dry air atmosphere) or an inert atmosphere (for example, nitrogen). In order to suppress oxidation of the metal powder in the green compact, it is preferable to perform the heat treatment of the green compact in an inert atmosphere. When the heat treatment temperature is too high, the metal powder is easily oxidized and the resin composition is easily deteriorated, by a trace amount of oxygen that is unavoidably included in the green compact during the production process. Furthermore, in order to suppress oxidation of the metal powder and deterioration of the resin composition, the time for maintaining the above-described heat treatment temperature may be several minutes or more and 4 hours or less, and preferably 15 minutes or more and 3 hours or less.

The present invention is not necessarily limited to the above-described embodiments. Various modifications of the present invention can be made as long as the gist of the present invention is maintained, and these modification examples are also included in the present invention.

EXAMPLES

The present invention will be described in detail by way of the following Examples and Comparative Examples. The present invention is not intended to be limited by the following Examples.

Example 1

A compound powder for a dust core was obtained by mixing a metal powder, a resin, and a metal salt having a saturated fatty acid group in a V-type mixer for 30 minutes. The masses of the metal powder, bismaleimide resin, and each metal salt are shown in the following Table 1.

A pure iron powder was used as the metal powder. As the pure iron powder, a commercial product (Somaloy 500H™) manufactured by Höganäs AB was used. The average particle size of the pure iron powder was 75 μm.

As the resin, a bismaleimide resin was used. As the bismaleimide resin, a commercial product (KIR-30) manufactured by KYOCERA Corporation was used.

As the metal salt having a saturated fatty acid group, calcium caprylate was used.

A ring-shaped (tubular-shaped) green compact was obtained by compacting of the compound powder using a hydraulic press machine. The pressure for compacting was 1200 MPa. The outer diameter of the ring-shaped green compact was 30 mm, the inner diameter of the ring-shaped green compact was 20 mm, and the height of the ring-shaped green compact was 5 mm. A ring-shaped (tubular-shaped) dust core was obtained by a heat treatment of the green compact in a dry air atmosphere. The heat treatment temperature was 300° C., and the heat treatment time was 60 minutes.

<Measurement of Radial Crushing Strength>

A compaction pressure was applied to the side faces of the dust core in a direction perpendicular to the central axis line of the ring-shaped dust core. The compaction pressure was increased, and then the compaction pressure at the time when the dust core was destroyed was measured. The compaction pressure at the time when the dust core was destroyed means radial crushing strength (unit: MPa). Measurement of the radial crushing strength was carried out in an air atmosphere at room temperature (25° C.). The radial crushing strength of Example 1 is shown in the following Table 1.

<Evaluation of Rust-Preventiveness of Dust Core>

In order to measure the rust-preventiveness of a dust core, a dust core (green compact that has been subjected to a heat treatment) was produced by the above-described method. The entire dust core was immersed in pure water held in a container. After sealing of the container, the dust core immersed in pure water was left to stand in an air atmosphere at room temperature. From the day on which the dust core was immersed in pure water, the time (unit: day) taken until brown rust leaked out from the dust core was measured. The rust-preventiveness (anti-rust) of the dust core of Example 1 is shown in the following Table 1.

<Evaluation of Rust-Preventiveness of Green Compact>

In order to measure the rust-preventiveness of a green compact, an uncured green compact (green compact that was not subjected to a heat treatment) was produced by the above-described method. The entire green compact was immersed in pure water held in a container. After sealing of the container, the green compact immersed in pure water was left to stand in an air atmosphere at room temperature. From the day on which the green compact was immersed in pure water, the time (unit: day) taken until brown rust leaked out from the green compact was measured. The rust-preventiveness (anti-rust) of the green compact of Example 1 is shown in the following Table 1.

Examples 2 to 7 and Comparative Examples 1 to 4

The resin and metal salt used for the production of the compound powders of each of Examples 2 to 7 and Comparative Examples 1 to 4 are shown in the following Table 1. The masses of the pure iron powder, resin, and each metal salt used for each of Examples 2 to 7 and Comparative Examples 1 to 4 are shown in the following Table 1.

As the polyphenylene sulfide resin in the following Table 1, a commercial product (DSP-B100™) manufactured by DIC Corporation was used.

As the polyimide resin in the following Table 1, a commercial product (AURUM PD450L™) manufactured by Mitsui Chemicals, Inc. was used.

A compound powder, a green compact, and a dust core of each of Examples 2 to 7 and Comparative Examples 1 to 4 were produced by methods similar to those of Examples 1, except for the above-described items. The radial crushing strength of the dust core of each of Examples 2 to 7 and Comparative Examples 1 to 4 was measured by a method similar to that of Example 1. The radial crushing strength of each of Examples 2 to 7 and Comparative Examples 1 to 4 is shown in the following Table 1. The rust-preventiveness of the dust core of each of Examples 2 to 7 and Comparative Examples 1 to 4 was evaluated by a method similar to that of Example 1. The rust-preventiveness of the dust core of each of Examples 2 to 7 and Comparative Examples 1 to 4 is shown in the following Table 1. The rust-preventiveness of the green compact of each of Examples 2 to 7 and Comparative Examples 1 to 4 was evaluated by a method similar to that of Example 1. The rust-preventiveness of the green compact of each of Examples 2 to 7 and Comparative Examples 1 to 4 is shown in the following Table 1.

Examples 1 to 3 and Comparative Examples 1 and 2 use a bismaleimide resin in common. Examples 1 to 3 and Comparative Examples 1 and 2 show that the radial crushing strength of the dust core is increased concomitantly with a reduction in the number of carbon atoms of the saturated fatty acid group constituting the metal salt.

Examples 4 and 5 and Comparative Example 3 use a polyphenylene sulfide resin in common. Examples 4 and 5 and Comparative Example 3 also show that the radial crushing strength of the dust core is increased concomitantly with a reduction in the number of carbon atoms of the saturated fatty acid group constituting the metal salt.

Examples 6 and 7 and Comparative Example 4 use a polyimide resin in common. Examples 6 and 7 and Comparative Example 4 also show that the radial crushing strength of the dust core is increased concomitantly with a reduction in the number of carbon atoms of the saturated fatty acid group constituting the metal salt.

In the case of Examples 1, 2, 4, and 6 in which the number of carbon atoms of the saturated fatty acid group R (caprylic acid group or caproic acid group) is in the range of 6 to 10, at the time point when 6 months had passed after the dust core was immersed in pure water, leakage of rust from the dust core was not observed by visual inspection.

In the case of Examples 1, 2, 4, and 6 in which the number of carbon atoms of the saturated fatty acid group R (caprylic acid group or caproic acid group) is in the range of 6 to 10, at the time point when 6 months had passed after the green compact was immersed in pure water, leakage of rust from the green compact was not observed by visual inspection.

That is, in the case of Examples 1, 2, 4, and 6, rust of the magnetic powder included in each of the dust core and the green compact was suppressed for 6 months.

On the other hand, in the case of Examples 3, 5, and 7 and Comparative Examples 1 to 4, at the time point when one day had passed after the dust core was immersed in pure water, leakage of rust from the dust core was observed by visual inspection.

In the case of Examples 3, 5, and 7, at the time point when one day had passed after the green compact was immersed in pure water, leakage of rust from the green compact was observed by visual inspection.

In the case of Comparative Examples 1 to 4, at the time point when 12 days had passed after the green compact was immersed in pure water, leakage of rust from the green compact was observed by visual inspection.

TABLE 1

| Table 1 | | Unit | Example 1 | Example 2 | Example 3 | Comparative Example 1 | Comparative Example 2 | Example 4 | Example 5 | Comparative Example 3 | Example 6 | Example 7 | Comparative Example 4 |
|---|---|---|---|---|---|---|---|---|---|---|---|---|---|
| Resin | Bismaleimide resin | g | 0.50 | 0.50 | 0.50 | 0.50 | 0.50 | — | — | — | — | — | — |
| | Polyphenylene sulfide resin | g | — | — | — | — | — | 0.50 | 0.50 | 0.50 | — | — | — |
| | Polyimide resin | g | — | — | — | — | — | — | — | — | 0.50 | 0.50 | 0.50 |
| Metal powder | Pure iron powder | g | 100 | 100 | 100 | 100 | 100 | 100 | 100 | 100 | 100 | 100 | 100 |
| Metal salt | Calcium caprylate | g | 0.50 | — | — | — | — | 0.50 | — | — | 0.50 | — | — |
| | Calcium caproate | g | — | 0.50 | — | — | — | — | — | — | — | — | — |
| | Barium laurate | g | — | — | 0.50 | — | — | — | 0.50 | — | — | 0.50 | — |
| | Barium stearate | g | — | — | — | 0.50 | — | — | — | 0.50 | — | — | 0.50 |
| | Zinc stearate | g | — | — | — | — | 0.50 | — | — | — | — | — | — |
| Radial crushing strength | | MPa | 84 | 84 | 76 | 66 | 36 | 64 | 70 | 55 | 63.8 | 65 | 51 |
| Anti-rust | Dust core | — | No rust | No rust | 1 Day | 1 Day | 1 Day | No rust | 1 Day | 1 Day | No rust | 1 Day | 1 Day |
| | Green compact | — | No rust | No rust | 1 Day | 12 Days | 12 Days | No rust | 1 Day | 12 Days | No rust | 1 Day | 12 Days |

INDUSTRIAL APPLICABILITY

A dust core having excellent mechanical strength can be produced by using the compound for dust core according to an aspect of the present invention.

The invention claimed is:

1. A compound for dust core, comprising:
a metal powder including iron;
a resin composition; and
a metal salt,
wherein the metal salt is represented by $R_2M$,
the R represents a saturated fatty acid group having 6 or more and 10 or less carbon atoms,
M represents at least one metal element between Ca and Ba,
the metal powder consists of only at least one selected from the group consisting of simple substance of iron and an alloy including iron,
at least a portion of the surface of a portion or all of metal particles constituting the metal powder is covered with the resin composition,
the resin composition includes at least one resin selected from the group consisting of an epoxy resin, a bismaleimide resin, a polyimide resin, and a polyphenylene sulfide resin, and
a sum of masses of the epoxy resin, the bismaleimide resin, the polyimide resin, and the polyphenylene sulfide resin is 0.01 parts by mass or more and 1.00 parts by mass or less with respect to 100 parts by mass of the metal powder.

2. The compound for dust core according to claim 1, wherein the resin composition includes a bismaleimide resin.

3. The compound for dust core according to claim 2, wherein the bismaleimide resin is a thermosetting resin powder.

4. The compound for dust core according to claim 2, wherein the bismaleimide resin includes an addition reaction product of a polymaleimide and an aminophenol.

5. The compound for dust core according to claim 4, wherein a proportion by mass of the aminophenol is 5 to 40 parts by mass with respect to 100 parts by mass of the polymaleimide.

6. The compound for dust core according to claim 4, wherein a content of the addition reaction product in the bismaleimide resin is 30 to 80% by mass.

7. The compound for dust core according to claim 2, wherein the bismaleimide resin includes an epoxy compound and an addition reaction product of a polymaleimide and an aminophenol.

8. The compound for dust core according to claim 1, comprising:
a first powder consisting of only the metal powder and the resin composition; and
a second powder consisting of only the metal salt.

9. A green compact comprising:

the compound for dust core according to claim 1.

10. The green compact according to claim 9, the metal salt is dispersed in the green compact.

11. The green compact according to claim 9, wherein the green compact has an annular shape or a tubular shape.

12. A dust core formed from the compound for dust core according to claim 1.

13. The dust core according to claim 12, the metal salt is dispersed in the dust core.

14. The dust core according to claim 12, wherein the dust core has an annular shape or a tubular shape.

15. The dust core according to claim 12, wherein the metal salt exists in the vicinity of the surface of the dust core.

16. The compound for dust core according to claim 1, wherein the resin composition includes a polyimide resin.

17. The compound for dust core according to claim 16, wherein the polyimide resin is a thermoplastic resin powder.

18. The compound for dust core according to claim 1, wherein the resin composition includes a polyphenylene sulfide resin.

19. The compound for dust core according to claim 18, wherein the polyphenylene sulfide resin is a thermoplastic resin powder.

20. The compound for dust core according to claim 1, comprising:

a first powder consisting of only the metal powder and the resin composition; and a second powder consisting of only the metal salt and a wax different from the metal salt.

21. The compound for dust core according to claim 1, wherein the compound is obtained by mixing:

a first powder consisting of only the metal powder and the resin composition; and a second powder consisting of only the metal salt and a wax different from the metal salt.

22. The compound for dust core according to claim 1, wherein the compound is obtained by mixing:

a first powder consisting of only the metal powder and the resin composition; and a second powder consisting of only the metal salt.

23. The compound for dust core according to claim 1, wherein a particle size of the metal powder is 60 μm or more and 150 μm or less.

24. The compound for dust core according to claim 1, wherein a sum of the mass of the metal salt is 0.01 parts by mass or more and 0.70 parts by mass or less with respect to 100 parts by mass of the metal powder.

25. The compound for dust core according to claim 1, wherein the resin composition further includes at least one component selected from the group consisting of a curing agent, a coupling agent, a curing accelerator, a flame retardant, and a wax.

* * * * *